United States Patent [19]
Ditlinger

[11] 3,768,334
[45] Oct. 30, 1973

[54] LOAD EQUALIZED TENSION TORSION TIE BAR

[75] Inventor: Richard J. Ditlinger, South Bend, Ind.

[73] Assignee: The Bendix Corporation, South Bend, Ind.

[22] Filed: June 26, 1972

[21] Appl. No.: 266,012

[52] U.S. Cl. .................................. 74/579 R, 64/12
[51] Int. Cl. ............................................. F16c 7/04
[58] Field of Search ...................... 74/579 R; 64/12

[56] References Cited
UNITED STATES PATENTS
3,279,278  10/1966  Eldred .............................. 74/579 R
3,411,379  11/1968  Deyerling .......................... 74/579 R Primary Examiner—Charles J. Myhre
Assistant Examiner—F. D. Shoemaker
Attorney—Gordon H. Chenez et al.

[57] ABSTRACT

A laminated tie bar or coupling particularly adapted to interconnect a helicopter rotor arm and rotor blade is provided with a pair of spaced apart end bushings interconnected by an endless belt. A pliable material interposed between the belt and each end bushing provides a bearing surface therebetween which deforms under unequal pressure or load distribution as a result of angular movement of an end bushing causing a bending moment on the belt which deformation redistributes and equalizes the pressure or load imposed on the belt.

7 Claims, 5 Drawing Figures

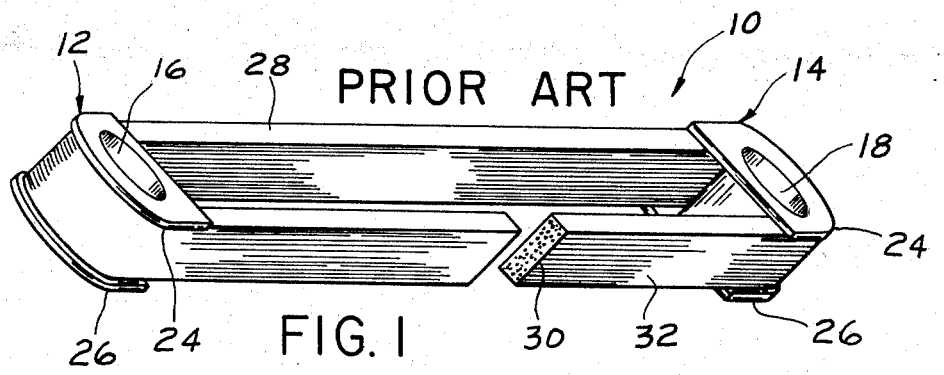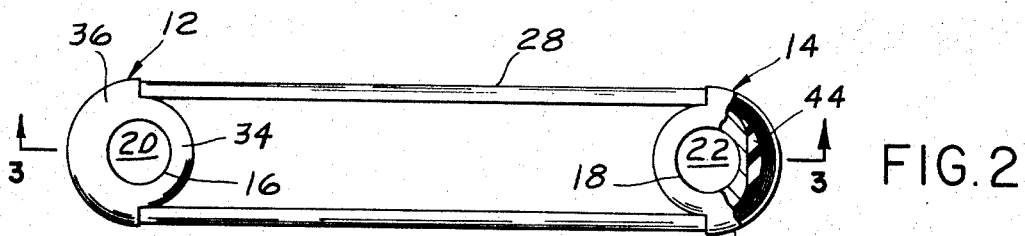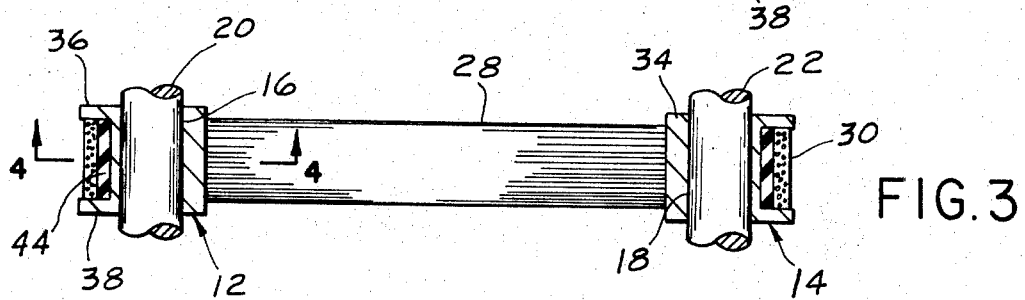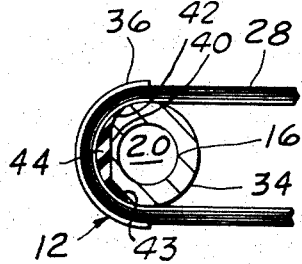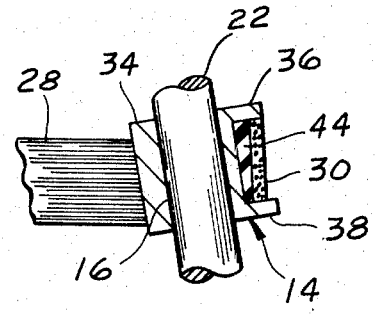

LOAD EQUALIZED TENSION TORSION TIE BAR

BACKGROUND OF THE INVENTION

Tie bars of the abovementioned helicopter type are adapted to absorb cylic torsional motion while under a high tension load wherein the tensile stress fluctuation due to cyclic torsional motion is low in comparison to the relatively constant tensile stress resulting from the tension load. However, in some tie bar applications the end bushings may be subjected to angular motion whereby a bending movement is imposed on the belt bearing thereagainst which bending moment may produce a tensile stress in the belt substantially as great as that created by the tension load. As a result the belt tends to deteriorate rapidly structurally resulting in a significantly shorter operating life thereof.

Reference is made to U.S. Pat. No. 3,460,628 issued Aug. 12, 1969, to James A. Tankersley (common assignee) which patent discloses a conventional tie bar of the abovementioned type.

SUMMARY OF THE PRESENT INVENTION

It is an object of the present invention to provide a tie bar having a pair of end bushings interconnected by an endless belt wherein a deformable material interposed between the end bushings and belt serves to equalize the bearing load therebetween.

It is another object of the present invention to provide means for equalizing the bearing load between interconnected force transmitting members one of which is movable angularly relative to the other.

It is a further object of the present invention to provide a tie bar having a pair of spaced apart end bushings interconnected by an endless belt adapted to resist tension-torsion loads therebetween and wherein a bearing material deformable under pressure is interposed between the end bushings and belt to equalize the bearing load on the latter.

Other objects and advantages of the present invention will be apparent from the following description taken with the accompanying drawings.

BRIEF DESCRIPTION OF THE DRAWINGS

FIG. 1 is a schematic representation in a perspective of a conventional or prior art tie bar adapted for helicopter use.

FIG. 2 is a schematic representation in plan view of a tie bar embodying the present invention.

FIG. 3 is a section view taken on line 3—3 of FIG. 2.

FIG. 4 is a section view taken on line 4—4 of FIG. 3.

FIG. 5 is a view of one of the end bushings of FIG. 3 shown in a tilted position thereby imposing a bending moment on the belt.

DESCRIPTION OF THE PREFERRED EMBODIMENT

Referring to FIGS. 1 and 2 wherein like numerals designate corresponding structural elements a laminated coupling or tie bar generally indicated by 10 includes a pair of spaced apart end bushings 12 and 14 having openings 16 and 18, respectively, therethrough which are adapted to receive associated mating shafts or pins 20 and 22 for which the tie bar 10 is particularly adapted.

Each of the end bushings 12 and 14 is provided with integral spaced apart and parallel flange portions 24 and 26. A laminated endless belt 28 wrapped around end bushings 12 and 14 is retained thereon by flange portions 24 and 26.

The endless belt 28 may be formed of a plurality of wires or filament material 30 suitably integrated by a polyurethane or elastomer adhesive 32 such as taught by abovementioned U.S. Pat. No. 3,460,628.

It will be understood that the tie bar 10 in its helicopter operating environment is normally subject to relatively high tensile end loading and simultaneous torsional oscillation about an axis in line with said applied end load which results in substantially equal force distribution on the plurality of wires or filamentary material 30. However, in certain cases of operation of the tie bar 10, it has been found that either or both end bushings 12 and 14 may be tilted toward and/or away from the other end bushing by the shaft or pin 20 or 22 mating therewith. Such tilting of the end bushing imposes a bending moment on the belt 28 wherein certain wires or filaments 30 thereof are stretched to a greater extent than the remaining wires thereby creating corresponding relatively high tensile stresses in the stretched wires which, in turn, causes rapid deterioration of the belt 28.

Referring to FIGS. 2 through 5, the end bushings 12 and 14 are each provided with a sleeve portion 34 having integral axially spaced apart semi-circular flange portions 36 and 38 extending radially outwardly therefrom. The sleeve portion 34 intermediate the ends of flange portions 36 and 38 is provided with a flat or relatively large radius surface 40 the opposite axially extending edges of which are curved as at 42 and 43 wherein the radius of curvature provides a gradual transition from surface 40 to the periphery of sleeve portion 34.

A suitable pliable material 44 of any suitable type which behaves as a fluid when subjected to high bearing pressure is molded or otherwise suitably secured to the sleeve portion 34 and provided with a radius of curvature equal to sleeve portion 34 thereby establishing circularity of the latter. Such pliable material may take the form of well known commercially available elastomers such as DuPont Co. "Adiprene."

As shown in FIGS. 2 through 5 the belt 28 overlaps the pliable material 44 which is trapped between the belt 28 and sleeve portion 34 including flange portions 36 and 38. The belt 28 including wires or filaments 30 and polyurethane adhesive 32 bears against the pliable material 44 which exerts a hydrostatic pressure against the flange portions 36 and 38. The hydrostatic pressure is greatest at the radially innermost wires or filaments 30 and decreases to zero at the radially outermost wires or filaments 30 thereby tending to prevent extrusion or leakage of the pliable material 44 outwardly from sleeve portion 34. Since the pliable material 44 is pressure responsive, it will flow from a region of higher pressure to a region of lower pressure thereby equalizing the pressure per unit area exposed to the belt 28.

Referring to FIG. 5, the end bushing 12 is shown in an exaggerated tilted position relative to the end bushing 14 as a result of movement of pin 20 which, as mentioned heretofore, imposes a bending moment on the belt 28 tending to lengthen the lower wires or filaments 30 and shorten the upper wires or filaments 30. The resulting higher pressure exerted by the stretched lower wires or filaments 30 against the pliable material 44 causes the same to flow upward to the lower pressure zone of the pliable material 44 thereby reducing the pressure at the lower portion and raising the pressure at the upper portion to equalize the bearing pressure against belt 28 and thus the tensile load on the wires or filaments 30.

It will be recognized that a tilting motion of the end bushing 12 in the opposite direction from that shown in FIG. 5 has a reverse effect from that described above. However, in any event, the pliable material 44 trapped between end bushing 12 and belt 28 is distributed therebetween to establish equalization of pressure against belt 28 in the above described manner.

The above described structure for equalizing bearing pressure is not confined to the preferred helicopter tie bar shown and described. It will be understood that the pliable material 44 may be suitably embodied in bearing structure intended as a replacement for a conventional high capacity self-aligning bearing subject to cyclic motion. It has been determined that the permissible bearing pressure on the pliable material 44 may be fifty to one-hundred times greater than that of the bearing surface of a conventional self-aligning bearing thereby resulting in a correspondingly smaller bearing structure for a given capacity.

I claim:

1. A tension torsion tie bar for connecting two members comprising:
    first and second spaced apart annular bushings each having a sleeve portion adapted to receive one of said two members and provided with axially spaced apart flange portions extending radially outwardly therefrom;
    a belt wrapped around said first and second bushings and retained thereon by said axially spaced apart flange portions;
    a pliable material trapped between said belt and said sleeve portion and providing a deformable bearing surface for said belt;
    said pliable material being pressure responsive and adapted to flow from a high pressure zone to a lower pressure zone intermediate said belt and sleeve portion to thereby equalize the bearing pressure transversely across said belt.

2. A tension torsion tie bar as claimed in claim 1, wherein:
    said axially spaced apart flange portions are semi-circular.

3. A tension torsion tie bar as claimed in claim 2, wherein:
    said sleeve portion is provided with a depressed outer peripheral surface portion bounded by said axially spaced apart flange portions;
    said pliable material being trapped between said depressed surface and said belt and providing a bearing surface having a radius of curvature equal to the non-depressed peripheral portion of said sleeve portion.

4. A tension torsion tie bar as claimed in claim 3, wherein:
    said depressed outer peripheral surface portion is defined by a relatively flat section having circumferentially spaced apart axially extending curved edges which merge with the depressed peripheral portion of said sleeve portion.

5. A tension torsion tie bar as claimed in claim 1, wherein:
    said belt is formed of a lamination of spaced apart parallel filaments joined together by an elastomeric adhesive.

6. A tension torsion tie bar as claimed in claim 5, wherein:
    said pliable material is distributed to maintain the tensile load absorbed by each of said filaments substantially equal under the influence of a bending moment imposed on said belt by tilting movement of said bushings.

7. A tension torsion tie bar as claimed in claim 1, wherein:
    said belt bears against said axially spaced apart flange portions thereby preventing extrusion of said pliable material therebetween.

* * * * *